(12) United States Patent
Kelly

(10) Patent No.: US 6,518,541 B1
(45) Date of Patent: Feb. 11, 2003

(54) DUTY CYCLE STABILIZATION IN DIRECT METAL DEPOSITION (DMD) SYSTEMS

(76) Inventor: Joseph K. Kelly, 44696 Helm St., Plymouth, MI (US) 48170

( * ) Notice: Subject to any disclaimer, the term of this patent is extended or adjusted under 35 U.S.C. 154(b) by 0 days.

(21) Appl. No.: 09/714,087

(22) Filed: Nov. 16, 2000

Related U.S. Application Data

(60) Provisional application No. 60/165,679, filed on Nov. 16, 1999.

(51) Int. Cl.[7] .......................... B23K 26/00; B23K 26/04
(52) U.S. Cl. .............................. 219/121.62; 219/121.6; 219/121.63; 219/121.64
(58) Field of Search ....................... 219/121.62, 121.63, 219/121.64, 121.6; 700/123

(56) References Cited

U.S. PATENT DOCUMENTS

| | | | |
|---|---|---|---|
| 4,323,756 A | | 4/1982 | Brown et al. .......... 219/121 LF |
| 4,724,299 A | | 2/1988 | Hemmeke ............... 219/121 L |
| 5,246,745 A | * | 9/1993 | Baum et al. ................. 427/140 |
| 5,517,420 A | * | 5/1996 | Kinsman et al. .......... 219/121.6 |
| 5,541,721 A | * | 7/1996 | Scheuer et al. ............. 399/178 |
| 5,595,670 A | * | 1/1997 | Mombo-Caristan .... 219/121.14 |
| 5,659,479 A | * | 8/1997 | Duley et al. ............. 219/121.6 |
| 5,714,735 A | * | 2/1998 | Offer .......................... 219/136 |
| 5,729,277 A | * | 3/1998 | Morrison .................... 347/234 |
| 5,773,097 A | * | 6/1998 | Rogari ........................ 118/630 |
| 5,837,960 A | * | 11/1998 | Lewis et al. ............ 219/121.63 |
| 6,122,564 A | * | 9/2000 | Koch et al. .................. 700/123 |
| 6,396,025 B1 | * | 5/2002 | Pyritz et al. ........... 219/121.47 |
| 6,423,926 B1 | * | 7/2002 | Kelly .................... 219/121.63 |

* cited by examiner

Primary Examiner—Tom Dunn
Assistant Examiner—Lynne Edmondson
(74) Attorney, Agent, or Firm—Gifford, Krass, Groh, Sprinkle, Anderson & Citkowski, PC

(57) ABSTRACT

The laser duty cycle in a direct metal deposition (DMD™) system is monitored and used to control another device to keep the duty cycle within a desired range. In the preferred embodiment, the duty cycle is used to control powder flowrate to keep the duty cycle between 75 to 95%. For example, the powder flowrate may be increased or decreased by stepping up or stepping down the angular velocity of the feed-rod. The duty cycle of the laser is preferably measured by sampling the output signal of the feedback device at a sufficiently high rate, at least twice as fast as the on/off switching speed of the feedback device. The sampled data is stored in a memory buffer, and an algorithm is used to calculate the duty cycle over a period of time specified by the operator. The current duty cycle is preferably displayed on the screen of the operator's computer along with the values of the periodic measurements stored in the process history database.

6 Claims, 1 Drawing Sheet

DUTY CYCLE STABILIZATION IN DIRECT METAL DEPOSITION (DMD) SYSTEMS

REFERENCE TO RELATED APPLICATIONS

This application claims priority from U.S. provisional patent application Ser. No. 60/165,679, filed Nov. 16, 1999, the entire contents of which are incorporated herein by reference.

FIELD OF THE INVENTION

This invention relates generally to additive manufacturing and, more particularly, to apparatus and methods for keeping laser duty cycle within a desired range as part of a direct metal deposition (DMD) system.

BACKGROUND OF THE INVENTION

Fabrication of three-dimensional metallic components via layer-by-layer laser cladding was first reported in 1978 by Breinan and Kear. In 1982, U.S. Pat. No. 4,323,756 issued to Brown et al., describes a method for the production of bulk rapidly solidified metallic articles of near-net shape, finding particular utility in the fabrication of certain gas turbine engine components including discs and knife-edge air seals. According to the disclosure, multiple thin layers of feedstock are deposited using an energy beam to fuse each layer onto a substrate. The energy source employed may be a laser or an electron beam. The feedstock employed in the practice of the invention may be either a wire or powder material, and this feedstock is applied to the substrate in such a fashion that it passes through the laser beam and fuses to the melted portion of the substrate.

Different technologies have since evolved to improve such processes. U.S. Pat. No. 4,724,299 is directed to a laser spray nozzle assembly including a nozzle body with a housing that forms an annular passage. The housing has an opening coaxial with a passageway, permitting a laser beam to pass therethrough. A cladding powder supply system is operably associated with the passage for supplying cladding powder thereto so that the powder exits the opening coaxial with the beam.

Various groups are now working world-wide on different types of layered manufacturing techniques for fabrication of near-net-shape metallic components. In particular, nozzles of the type described above have been integrated with multi-axis, commercially available CNC machines for the fabrication of 3-dimensional components. U.S. Pat. No. 5,837,960 resides in a method and apparatus for forming articles from materials in particulate form. The materials are melted by a laser beam and deposited at points along a tool path to form an article of the desired shape and dimensions. Preferably the tool path and other parameters of the deposition process are established using computer-aided design and manufacturing techniques. A controller comprised of a digital computer directs movement of a deposition zone along the tool path and provides control signals to adjust apparatus functions, such as the speed at which a deposition head which delivers the laser beam and powder to the deposition zone moves along the tool path.

Most existing techniques, however, are based on open-loop processes requiring either considerable amount of periodic machining or final machining for close dimensional tolerances. Continuous corrective measures during the manufacturing process are necessary to fabricate net shape functional parts with close tolerances and acceptable residual stress. One exception is the system described in U.S. Pat. No. 6,122,564, filed Jun. 30, 1998. This application, the contents of which are incorporated herein by reference, describes a laser-aided, computer-controlled direct-metal deposition, or DMD, system wherein layers of material are applied to a substrate so as to fabricate an object or to provide a cladding layer.

In contrast to previous methodologies, the DMD system is equipped with feedback monitoring to control the dimensions and overall geometry of the fabricated article in accordance with a computer-aided design (CAD) description. The deposition tool path is generated by a computer-aided manufacturing (CAM) system for CNC machining, with post-processing software for deposition, instead of software for removal as in conventional CNC machining. Initial data using an optical feedback loop indicate that it totally eliminates intermediate machining and reduces final machining considerably.

Powder is delivered to the laser melt pool while the deposition head traces its paths across the workpiece. This is how layers are built and stacked one on another. Height control of each layer is necessary to achieve constant and uniform thickness for each layer. Height control is achieved by a feedback system. The workload of the feedback system is measured by how frequently it triggers. Equivalently, the duty cycle sensor measures the usage of the available laser power.

One must be assured that the layers are building to the correct height at ever (x,y,) point of the current plane. Every trigger of the feedback system assures that this is happening. However, every trigger also means that the laser is not being used as efficiently as possible, because ever trigger is equivalent to a momentary reduction in laser power. One source of inefficiency is fluctuations in powder flow rate. Occasionally, the flow rate strays above or below the acceptable range, and if not detected and corrected, this may lead to poor deposition quality and part rework.

If the nozzle is fully clogged or the optical window breaks, the feedback system will receive no trigger input, which is equivalent to a 100% duty cycle. A 100% duty cycle reading for a prolonged period of time would be the stimulus needed to automatically stop the decision. Maintaining quality through on-line feedback control of the powder flow rates will result in more reliable hands-off operation.

SUMMARY OF THE INVENTION

Broadly, this invention monitors laser duty cycle in a direct metal deposition (DMD™) system, and uses the data as input to control another device to keep the duty cycle within a desired range. In the preferred embodiment, the duty cycle is used to control powder flowrate to keep the duty cycle between 75 to 95%. For example, the powder flowrate may be increased or decreased by stepping up or stepping down the angular velocity of the feed-rod.

The duty cycle of the laser is preferably measured by sampling the output signal of the feedback device at a sufficiently high rate, at least twice as fast as the on/off switching speed of the feedback device. The sampled data is stored in a memory buffer, and an algorithm is used to calculate the duty cycle over a period of time specified by the operator. The current duty cycle is preferably displayed on the screen of the operator's computer along with the values of the periodic measurements stored in the process history database.

DETAILED DESCRIPTION OF THE INVENTION

Figure 1:
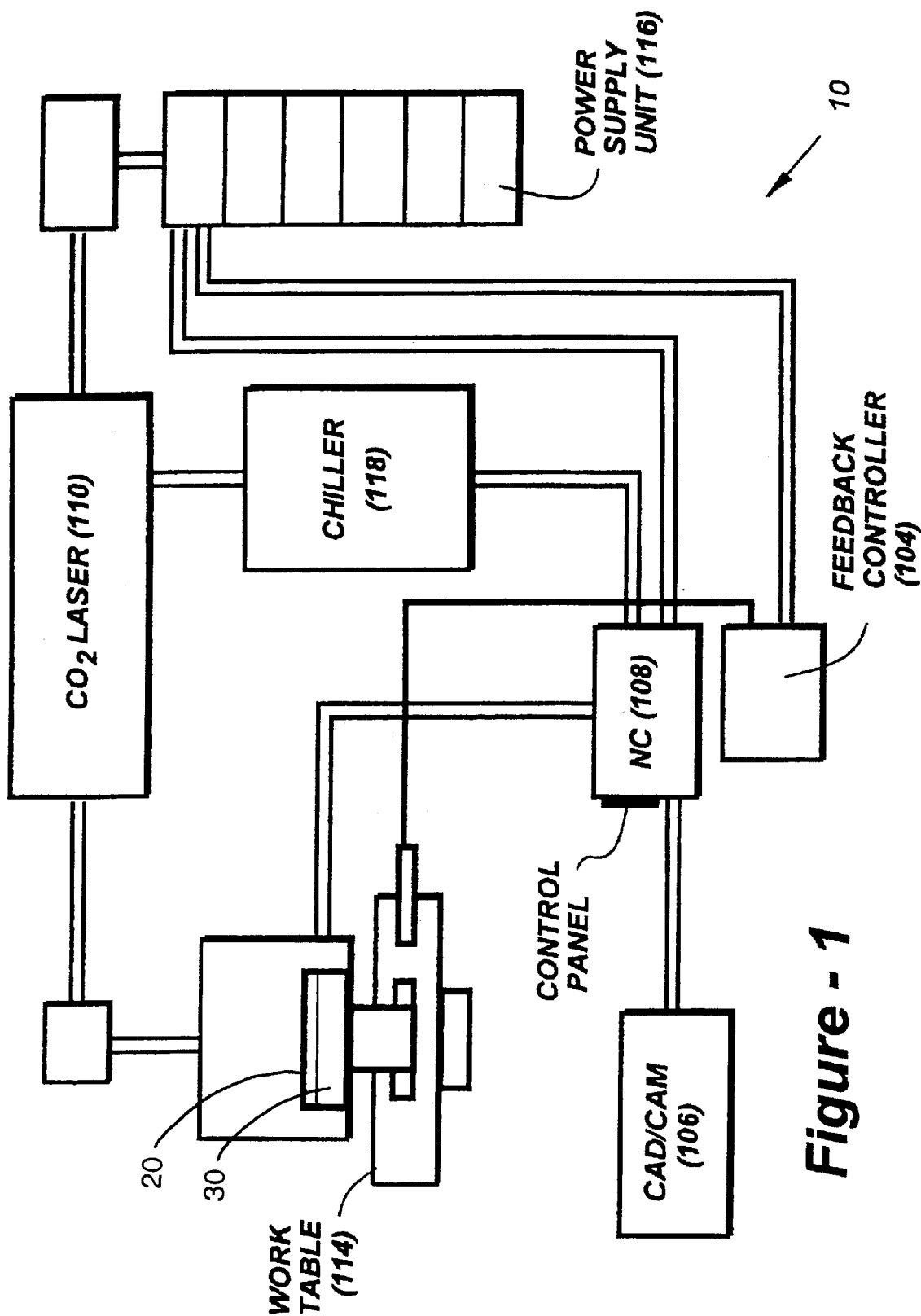
FIG. 1 is a block diagram depicting equipment associated with a DMD process applicable to the invention.

FIG. 1 illustrates a laser-aided, computer controlled direct material deposition (DMD) system in schematic form. The system 10 applies layers of material 20 on a substrate 30 to fabricate an object or cladding. As discussed above, the system is preferably equipped with feedback monitoring to control of the dimensions and overall geometry of the fabricated article. The geometry of the article is provided by a computer-aided design (CAD) system.

The deposition tool path is generated by a computer-aided manufacturing (CAM) system for CNC machining with post-processing software for deposition, instead of software for removal as in conventional CNC machining. CAM software interfaces with a feedback controller 104. These details of the laser-aided, computer controlled direct material deposition system can be found in U.S. Pat. No. 6,122,564, which is fully incorporated herein by reference, and are not all explicitly shown in FIG. 1.

The factors that affect the dimensions of material deposition include laser power, beam diameter, temporal and spatial distribution of the beam, interaction time, and powder flow rate. Adequate monitoring and control of laser power, in particular, has a critical effect on the ability to fabricate completed parts and products with complex geometries and within control tolerances. Accordingly, the feedback controller 80 of the direct material deposition system typically cooperates directly with the numerical controller 90, which, itself, controls all functions of the direct material deposition system, including laser power.

The laser source 110 of the DMD system is mounted above the substrate 30 and a layer of material 20 is deposited according to the description of the object. The laser has sufficient density to create a melt pool with the desired composition of substrate or previously deposited layer and powder delivered through a feed rod. The powder, typically metallic, is sprayed on the substrate preferably through a laser spray nozzle with a concentric opening for the laser beam, as described in U.S. Pat. No. 4,724,299, so that the powder exits the nozzle co-axially with the beam.

A numerical controller 108 controls all operating components of the DMD system of FIG. 1, including the operating conditions of the laser, receiving direction from the CAD/CAM system 106 for building the part or product. The numerical controller 108 also receives feedback control signals from the feedback controller 104 to adjust laser power output, and further controls the relative position of the substrate and laser spray nozzle. The CAD/CAM system 106 is equipped with software which enables it to generate a path across the substrate for material deposition.

The laser is used to locally heat a spot on a substrate, forming a melt pool into which powder is fed to create a deposit having a physical dimension such as height. As described in commonly assigned U.S. Pat. No. 6,122,564, the extent of the physical dimension is controlled using an optical feedback loop. Optical detection means coupled to an optoelectric sensor are used to monitor the deposit, and a feedback controller is operative to adjust the laser in accordance with the electrical signal, thereby controlling the rate of material deposition. In the preferred embodiment, the physical dimension is the height of the deposit, and the system further includes an interface to a computer-aided design (CAD) system including a description of an article to be fabricated, enabling the feedback controller to compare the physical dimension of the deposit to the description and adjust the energy of the laser in accordance therewith.

In terms of specific apparatus, the optical detection means preferably includes an apertured mask through which light from the deposit passes to reach the optoelectric sensor, and the feedback controller includes circuitry for adjusting the laser in accordance with the presence or absence of the light from the deposit. This allows the system to optically monitor the physical dimension of the deposit, and control the physical dimension in accordance with the description of the article to be fabricated. The deposition head, preferably equipped with flying optics, is advanced to different localized region of the substrate until the fabrication of the article is completed.

During the deposition of any material, height control is maintained using the feedback loop. This is made possible by lowering the laser power at key moments, near-instantaneously. For example, the laser is programmed for continuous beam-on at 1000 W, and a path is deposited for one minute. During deposition, height control feedback lowers the laser power to zero whenever the head reaches the proper height.

Of course, the duty cycle will vary with how frequently the laser power is lowered, that is, how hard the feedback loop is required to work. This number is like a heartbeat monitor for the DMD process. A total lack of feedback (triggering) suggests a serious error in the deposition process. The required action in such a situation is to stop the process and fix the problem. The problem might lie anywhere, for instance, in the powder system, the inert gas system, the beam delivery system, or operator error. In any case, the only solution is to stop the process and take corrective action.

Even without problems, a balance must be struck between height assurance and laser utilization. Empirically, it has been discovered that a desired compromise occurs with the DMD system operating within a selected "sweet range" of the duty cycle on the order of 75 to 95%. For example, if the aggregate of the time associated with the lowering of laser power adds up to 10 seconds, this is equivalent to saying that in the one minute of deposition time, the beam was on for 50 seconds out of 60 total seconds; or, that laser power was zero for 10 seconds out of 60. This equates to a duty cycle of 50/60, which equals 0.833 or 83.3%.

When operating within the desired range, drift may occur due to temperature fluctuations in the workpiece, and fluctuating powder flowrates. This invention therefore uses the duty cycle output as input for another device which controls the trend in the duty cycle signal. In the preferred embodiment, this is accomplished by controlling the powder flowrate. For example, the powder flowrate may be increased or decreased by stepping up or stepping down the feed-rod angular velocity.

The duty cycle of the laser is preferably measured by sampling the output signal of the feedback device at a sufficiently high rate, at least twice as fast as the on/off switching speed of the feedback device. The sampled data is stored in a memory buffer in some form. An algorithm is applied to the data, which may be simple or complex, depending on the complexity of the output signal generated by the feedback device, to calculate the duty cycle over a period of time, which the operator specifies. New data enters the buffer, and so on. The current duty cycle can be displayed visually on the screen of the operator's computer, and the values of the periodic measurements stored in the process history database.

I claim:

1. In a direct-metal deposition (DMD) system of the type wherein a laser having an ON/OFF duty cycle is used to create a meltpool into which powder is fed to create a deposit on a workpiece having a dimension which is optically monitored to generate a feedback signal, a method of keeping the duty cycle of the laser within a desired range, comprising the steps of:

sensing the duty cycle of the laser;

using the sensed value of the duty cycle to control a process parameter that affects the duty cycle; and controlling the parameter to maintain the duty cycle within the desired range.

2. The method of claim 1, wherein the process parameter is the flow rate of the powder.

3. The method of claim 2, wherein the powder flow rate is controlled by adjusting the angular velocity of the feed-rod.

4. The method of claim 1, wherein the acceptable range is between 75 and 95%.

5. The method of claim 1, wherein the duty cycle is sensed by sampling the feedback signal.

6. The method of claim 1, wherein the deposition is terminated if the duty cycle is 100% for a predetermined period of time.

* * * * *